United States Patent
Nagata et al.

(10) Patent No.: US 8,657,386 B2
(45) Date of Patent: Feb. 25, 2014

(54) VEHICLE WHEEL

(75) Inventors: Shinya Nagata, Saitama (JP); Masashi Kitagawa, Saitama (JP); Takeshi Hotaka, Saitama (JP); Tetsuya Mizone, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 12/876,295

(22) Filed: Sep. 7, 2010

(65) Prior Publication Data
US 2011/0057504 A1 Mar. 10, 2011

(30) Foreign Application Priority Data
Sep. 8, 2009 (JP) ................................ 2009-206549

(51) Int. Cl.
*B60B 21/12* (2006.01)
(52) U.S. Cl.
USPC .................................................... 301/95.102
(58) Field of Classification Search
USPC ................ 301/95.1; 152/381.3, 381.4, 381.5, 152/381.6, 514
See application file for complete search history.

(56) References Cited

U.S. PATENT DOCUMENTS

| | | | | | |
|---|---|---|---|---|---|
| 3,286,757 | A | * | 11/1966 | Thomas | 152/543 |
| 5,538,058 | A | * | 7/1996 | Aloy | 152/381.5 |
| 5,988,764 | A | * | 11/1999 | Deetz | 301/95.104 |
| 6,019,149 | A | * | 2/2000 | Stringer | 152/381.5 |
| 6,318,428 | B1 | * | 11/2001 | Lo | 152/381.4 |
| 7,487,811 | B2 | * | 2/2009 | Schelhaas | 152/381.5 |
| 2003/0136490 | A1 | * | 7/2003 | Koziatek | 152/514 |
| 2005/0210675 | A1 | * | 9/2005 | Price et al. | 29/894.31 |

FOREIGN PATENT DOCUMENTS

| | | |
|---|---|---|
| JP | 2000-280705 A | 10/2000 |
| JP | 2009-073247 A | 4/2009 |
| JP | 2009-123769 A | 6/2009 |

* cited by examiner

*Primary Examiner* — S. Joseph Morano
*Assistant Examiner* — Jean Charleston
(74) *Attorney, Agent, or Firm* — Carrier Blackman & Associates, P.C.; Joseph P. Carrier; Jeffrey T. Gedeon (57) ABSTRACT

There is provided a vehicle wheel which can reduce a rolling resistance by rising a tire temperature with a simple structure. A heat-insulation rubber is pasted on all circumference surface of a portion of an outer circumference surface of a rim other than a bead seating portion where a bead portion of a tire closely contacts and a rim flange portion. The heat-insulation rubber suppresses any heat transfer from air in a tire air chamber and from the internal surface of the tire to the rim at the outer circumference surface of the rim which contacts the air in the tire air chamber.

5 Claims, 9 Drawing Sheets

| | | COMPARATIVE EX.1 | EX.1 | EX.2 | EX.3 | EX.4 | EX.5 | COMPARATIVE EX.2 | EX.6 | EX.7 | EX.8 | EX.9 | EX.10 |
|---|---|---|---|---|---|---|---|---|---|---|---|---|---|
| COMPOSITION | IIR | 100 | 100 | 100 | 100 | 100 | 100 | | 50 | 50 | 50 | 50 | 50 |
| | EPDM | | | | | | | 50 | 50 | 50 | 50 | 50 | 50 |
| | CB(FEF) | 60 | 60 | 60 | 60 | 60 | 60 | 60 | 60 | 60 | 60 | 60 | 60 |
| | PROCESS OIL | 10 | 10 | 10 | 10 | 10 | 10 | 10 | 10 | 10 | 10 | 10 | 10 |
| | STEARIN ACID | 1 | 1 | 1 | 1 | 1 | 1 | | 1 | 1 | 1 | 1 | 1 |
| | ZINC OXIDE | 5 | 5 | 5 | 5 | 5 | 5 | 5 | 5 | 5 | 5 | 5 | 5 |
| | SULFUR | 1 | 1 | 1 | 1 | 1 | 1 | 1 | 1 | 1 | 1 | 1 | 1 |
| | VULCANIZING ACCELERATOR | 1 | 1 | 1 | 1 | 1 | 1 | 1 | 1 | 1 | 1 | 1 | 1 |
| | SILICA-ALUMINA BALLOON | | 50 | | | | | | | | | | |
| | CERAMICS BALLOON | | | 50 | | | | | 50 | 50 | | | |
| | SHIRASU BALLOON | | | | 50 | | | | | | 50 | | |
| | FOAMING AGENT | | | | | 4 | 8 | | | | | 4 | 8 |
| | Total Phr | 178.0 | 228.0 | 228.0 | 228.0 | 182.0 | 186.0 | 178.0 | 228.0 | 228.0 | 228.0 | 182.0 | 186.0 |
| ESTIMATION RESULT | HEAT TRANSFERENCE(%) | 100 | 88 | 91 | 87 | 71 | 53 | 99 | 86 | 87 | 86 | 74 | 55 |

- IIR : BUTYL RUBBER
- EPDM : ETHYLENE PROPYLENE RUBBER
- CB(FEF) : FEF CLASS CARBON BLACK

VEHICLE WHEEL

CROSS REFERENCE TO RELATED APPLICATION

This application claims the foreign priority benefit under Title 35, United States Code, §119(a)-(d) of Japanese Patent Application No. 2009-206549, filed on Sep. 8, 2009 in the Japan Patent Office, the disclosure of which is herein incorporated by reference in its entirety.

BACKGROUND OF THE INVENTION

1. Field of the Invention

The present invention relates to a vehicle wheel, and more particularly, to a vehicle wheel capable of reducing a rolling resistance of a tire attached to a wheel.

2. Description of the Related Art

Conventionally, it is known that rolling resistance decreases as a temperature of a tire of a vehicle rises. High temperature of the tire improves a gas mileage performance of the vehicle, and a gripping force at a tire tread portion is also improved. JP 2009-73247A discloses a technology of applying a heat-shield/heat-insulation coating having a thickness of 50 to 500 μm on a rim outer circumference surface other than a bead seating portion of the rim outer circumference surface and a rim flange portion thereof to form heat-shield/heat-insulation layer (see, in particular, FIG. 1).

According to the technology disclosed in JP2009-73247A, however, as the heat-shield/heat-insulation coating is applied on the rim outer circumference surface, it is necessary to mask the bead seating portion and the rim flange portion before a heat-insulation paint is applied or to process a vehicle wheel while rotating the vehicle wheel in order to prevent the heat-insulation paint from dripping in a painting/drying process and to obtain a uniform thickness, resulting in poor productivity. Also, because the paint is a liquid, it is difficult to control a layer thickness of such a paint to be uniform to secure quality.

SUMMARY OF THE INVENTION

The present invention can provide a vehicle wheel which can reduce a rolling resistance by increasing a tire temperature with a simple structure.

A first aspect of the present invention provides a vehicle wheel comprising a heat-insulation rubber that covers a portion of a rim outer circumference surface where air in a tire air chamber contacts.

According to the first aspect of the present invention, in comparison with a case in which a heat-insulation paint which forms a heat-shield/heat-insulation layer is painted like the prior art disclosed in JP 2009-73247A, since the heat-insulation rubber can be formed on the rim outer circumference surface uniformly at a predetermined thickness, a target heat-insulation performance can be surely accomplished. When a tire temperature rises due to heat originating from a friction with a road surface or hysteresis loss of the interior of a tire, the heat is transferred to air in the tire air chamber, and the temperature of the air in the tire air chamber rises, it is possible to suppress any dissipation of heat to the atmosphere through a rim and a disc via a portion where the air in the tire air chamber contacts the rim outer circumference surface of the vehicle wheel.

A second aspect of the present invention provides the vehicle wheel based on the first aspect, wherein the heat-insulation rubber is formed into a ring shape and is fitted onto the portion of the rim outer circumference surface where the air in the tire air chamber contacts.

According to the second aspect of the present invention, as the heat-insulation rubber formed into a ring shape is used, a process of pasting end portions of a tabular heat-insulation rubber to form the tabular heat-insulation rubber into a ring shape can be omitted. Moreover, the heat-insulation rubber formed into the ring shape can be stretched over the diameter of the rim flange portion of the rim by an attachment apparatus, and can be easily attached on the outer circumference surface of a well portion, and, the productivity of the heat-insulation layer becomes better than heat-insulation paints. Moreover, the contractive force of the heat-insulation rubber can be utilized as fixing force to the rim outer circumference surface.

A third aspect of the present invention provides the vehicle wheel based on the first aspect, wherein the heat-insulation rubber is shaped so as to match a cross-sectional contour of the rim outer circumference surface in a rim width direction.

According to the third aspect of the present invention, because the heat-insulation rubber is shaped so as to match the cross-sectional contour of the rim outer circumference surface in the rim width direction, the heat-insulation rubber can be caused to closely contact the rim outer circumference surface of the vehicle wheel having the rim outer circumference surface of the well portion normally not flat. As a result, it is possible to suppress any heat transfer to the rim from a portion of the rim outer circumference surface where air in the tire air chamber contacts.

A fourth aspect of the present invention provides the vehicle wheel based on the first aspect, wherein a part of the heat-insulation rubber located outside, a well portion on the rim outer circumference surface in a rim width direction has a thickness which gradually decreases as a location at the part goes toward an end part of the heat-insulation rubber, and the end part of the heat-insulation rubber extends up to a hump portion on the rim outer circumference surface.

According to the fourth aspect of the present invention, it is possible to reduce the possibility that the bead portion of a tire catches the end part of the heat-insulation rubber and peels or damages the heat-insulation rubber when the bead portion is fallen onto the well portion of the rim.

A fifth aspect of the present invention provides the vehicle wheel based on the second aspect, wherein the heat-insulation rubber shaped into the ring is produced by a production method comprising:

mixing a predetermined amount of a foaming agent in advance with a rubber material for the heat-insulation rubber to have a composition for generating isolated gas bubbles, before the rubber material is shaped into the ring;

kneading the mixture; and heating when shaping the kneaded mixture into the ring to cause the foaming agent to foam to produce the heat-insulation rubber including the isolated gas bubbles therein.

According to the fifth aspect of the present invention, isolated gas bubbles are distributed in the heat-insulation rubber, so that any heat transfer to the rim from the tire air chamber via the heat-insulation rubber can be extremely reduced. In particular, as the additive amount of the foam agent is set to a predetermined amount which does not produce any substantially successive foams or successive foams in the heat-insulation rubber, any heat transfer by the convection flow of gases in the substantially successive foams or in the successive foams is suppressed, thereby extremely reducing any heat transfer to the rim from the tire air chamber via the heat-insulation rubber.

According to the present invention, a tire temperature when a vehicle is running can be increased, a rolling resistance can be reduced, and the fuel economy can be improved.

DETAILED DESCRIPTION OF THE INVENTION

A detailed explanation will be given of a vehicle wheel according to a first embodiment of the present invention with reference to accompanying drawings.

<<First Embodiment>>
<Vehicle Wheel>

A vehicle wheel of the first embodiment will be explained with reference to FIGS. 1, 2, 3A, and 3B.

Figure 1:
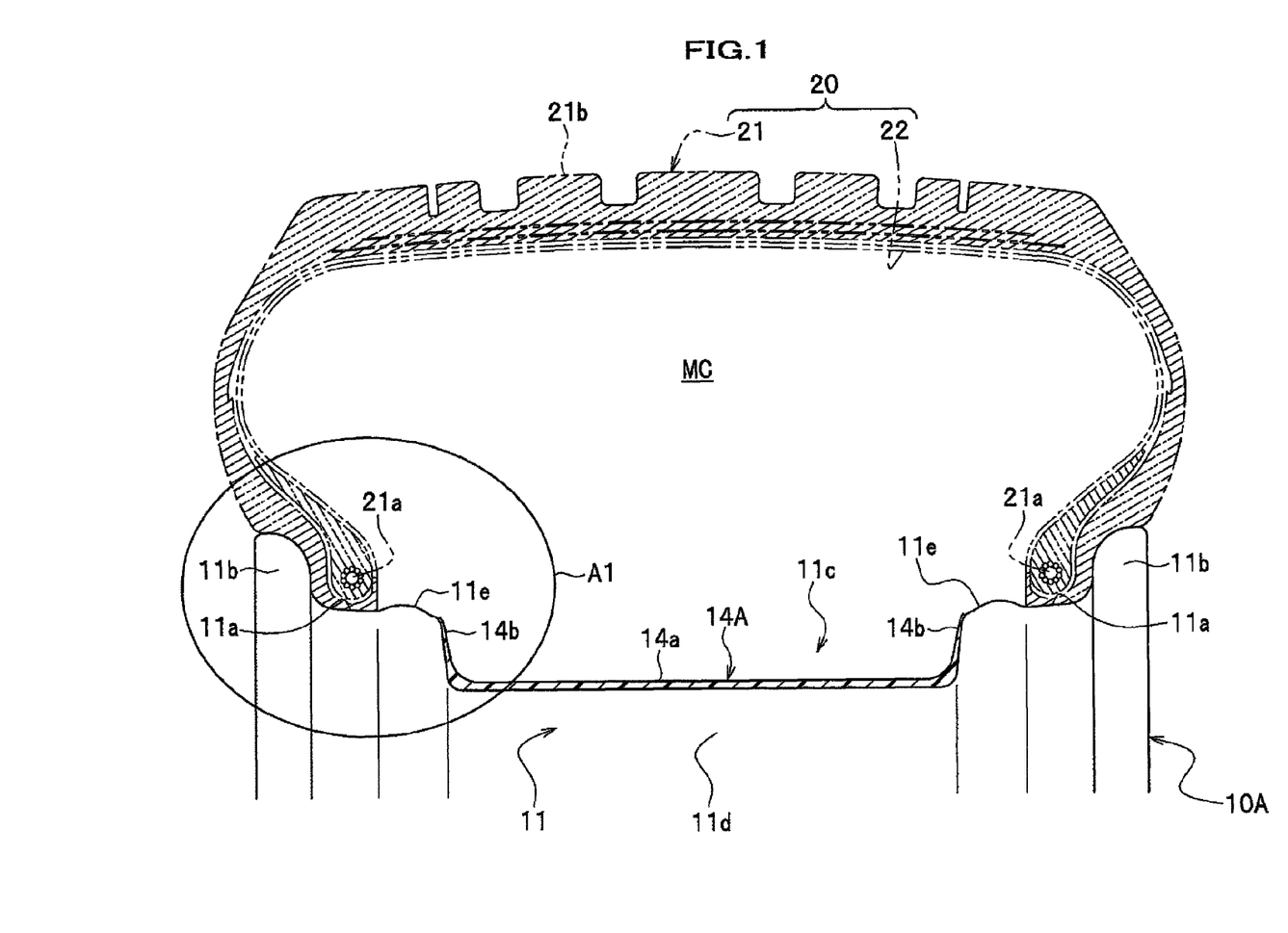
FIG. 1 is a partial front cross-sectional view showing a major part of a vehicle wheel on which a tire is mounted according to a first embodiment of the present invention, and showing a cross section of a heat-insulation rubber attached on a rim outer circumference surface and that of a tire.
Figure 2:
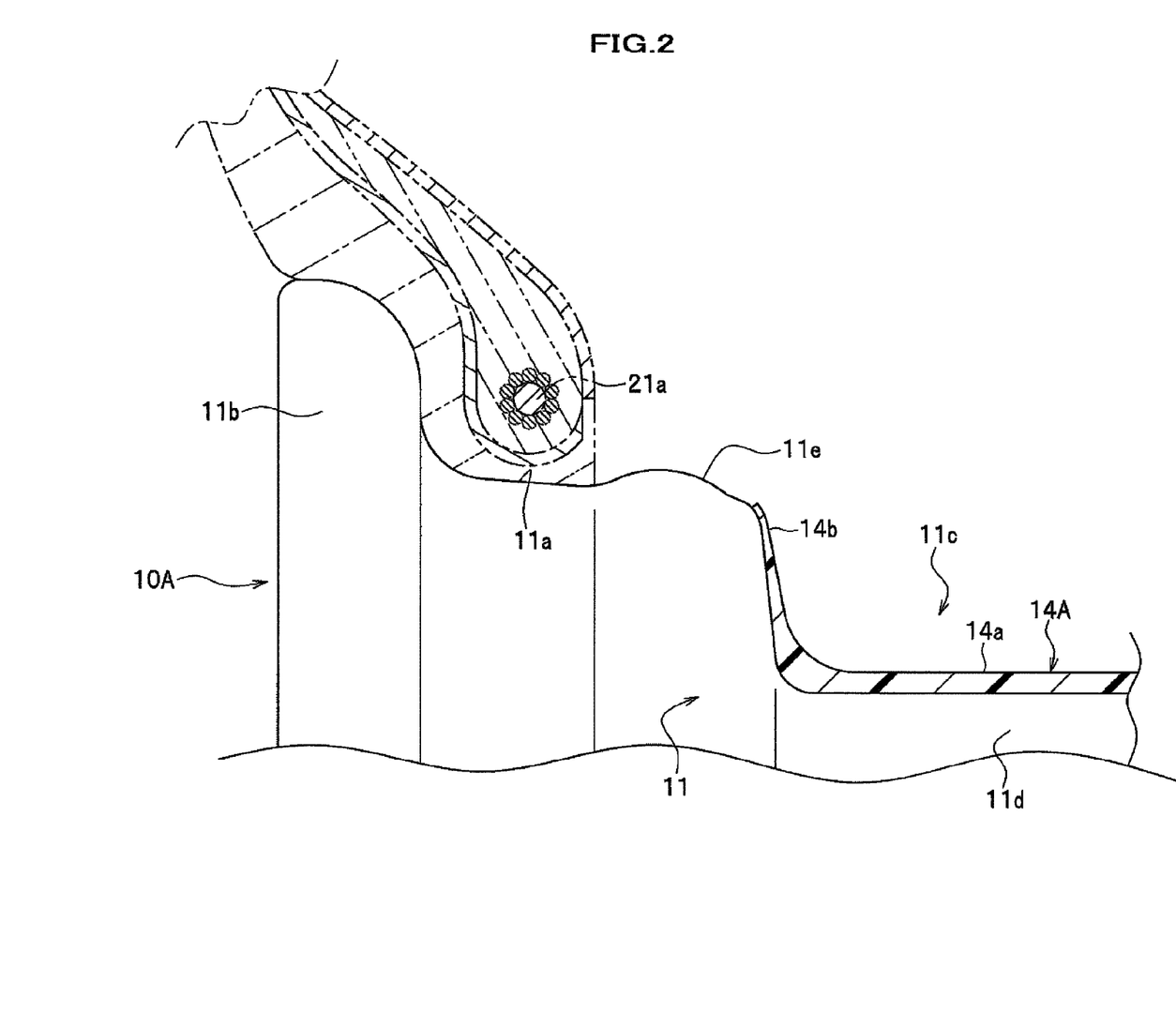
FIG. 2 is an enlarged view of a part A1 in FIG. 1.
Figure 3A:
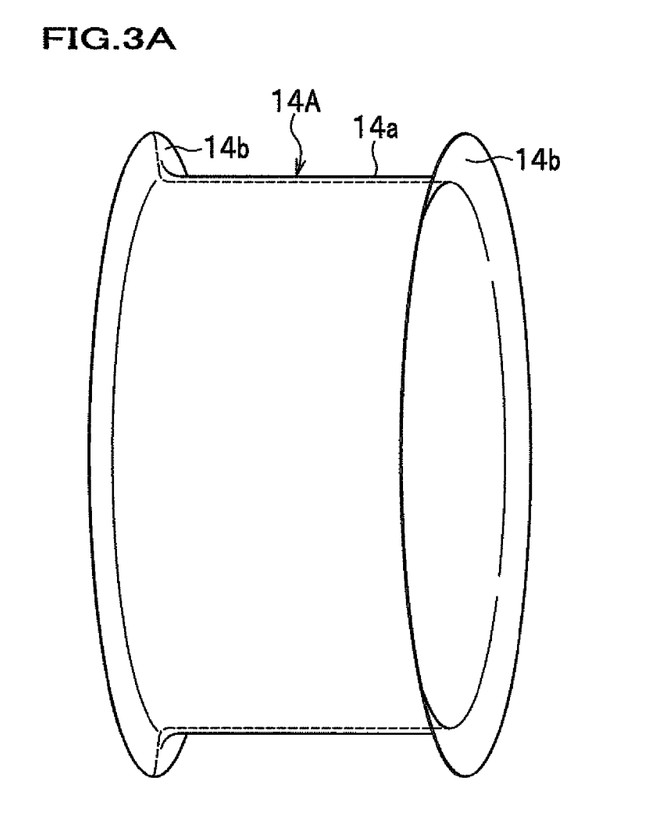
FIG. 3A is a perspective view showing an external appearance of the heat-insulation rubber formed into a ring shape, and showing an example of heat-insulation rubber so formed as to gradually reduce a thickness toward an end.
Figure 3B:
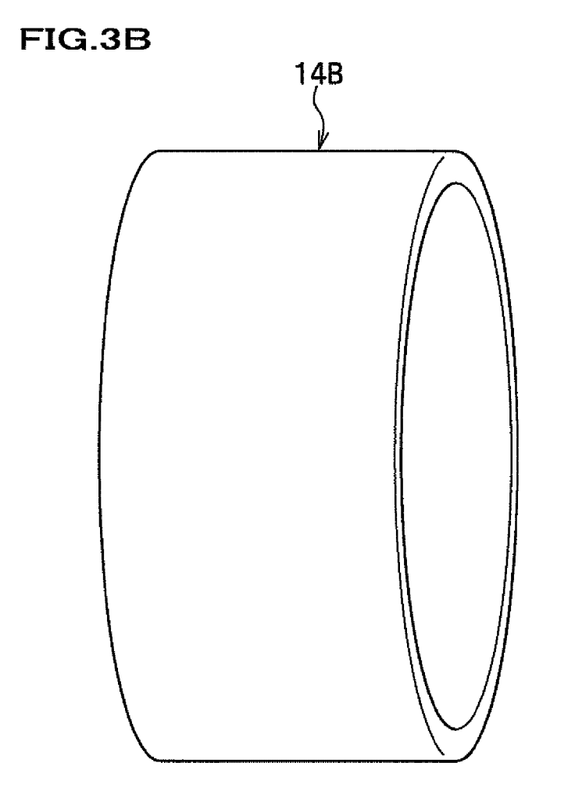
FIG. 3B is a perspective view showing an external appearance of the heat-insulation rubber formed into a ring shape, and showing an example of heat-insulation rubber so formed as to have a uniform thickness.

FIG. 1 is a partial front cross-sectional view showing a major part of a vehicle wheel on which a vehicular tire is mounted according to the first embodiment of the present invention, and showing a cross section of a heat-insulation rubber attached on a rim outer circumference surface and that of a tire. FIG. 2 is an enlarged view of a part A1 in FIG. 1. FIG. 3A is a perspective view showing an external appearance of the heat-insulation rubber formed in a ring shape, and showing an illustrative heat-insulation rubber so formed as to gradually reduce a thickness toward an end. FIG. 3B is a perspective view showing an external appearance of the heat-insulation rubber formed in a ring shape, and showing an illustrative heat-insulation rubber so formed as to have a uniform thickness.

As shown in FIG. 1, a vehicle wheel 10A includes a rim 11 for attaching a tire 20 thereto, and a disk (not shown) for coupling the rim 11 to a hub (not shown).

As shown in FIG. 1, the rim 11 has bead seating portions 11$a$, 11$a$ formed at both ends thereof in a wheel width direction, rim flange portions 11$b$, 11$b$ bent in a letter L shape from respective bead seating portions 11$a$, 11$a$ toward an exterior of a wheel radial direction, and a well portion 11$c$ hollowed inwardly of the wheel radial direction between the bead seating portions 11$a$, 11$a$. The vehicle wheel 10A also has hump portions 11$e$, 11$e$ rising outwardly of the wheel radial direction ahead of portions where the bead seating portions 11$a$, 11$a$ are hollowed into the well portion 11$c$.

Bead portions 21$a$ of the tire 20 are mounted on respective bead seating portions 11$a$. Accordingly, a tire air chamber MC which is an annular sealed space is formed between an outer circumference surface 11$d$ of the rim 11 (a rim outer circumference surface) and an inner circumference surface of the tire 20.

Note that regarding the tire 20, reference numeral 21 denotes a tire main body, reference numeral 22 denotes an inner liner, and reference numeral 21$b$ denotes a tread part.

The well portion 11$c$ is provided in order to cause the bead portions 21$a$, 21$a$ of the tire 20 to fall in the well portion 11$c$ at the time of rim fitting when the tire 20 is fitted to the rim 11.

The disk is so formed as to be continuous from an end of the rim 11 at a vehicle external side toward the internal side of the wheel radial direction. The rim 11 and the disk are both formed of, for example, a lightweight and high-strength material, such as an aluminum alloy or a magnesium alloy.

The material is not limited to the foregoing one, and the rim 11 and the disk both may be formed of steel or the like. Also, the vehicle wheel 10A may be a spoke-type wheel.

An undercoat layer (not shown) which is a clear paint with a thickness of 5 to 40 μm is formed on the whole outer circumference surface 11$d$ of the rim 11 including the bead seating portion 11$a$, the rim flange portion 11$b$, the well portion 11$c$, and the hump portion 11$e$. The undercoat layer is formed in order to increase the corrosion resistance of the outer circumference surface 11$d$ of the rim 11 and to improve a close-contact condition of the bead portion 21$a$ with the outer circumference surface 11$d$, and, a urethane-based, epoxy-based, acryl-based, or fluorine-based paint material having low heat conductivity or a blend thereof is desirable for the undercoat layer. Examples of such painting are electrodeposition coating and powder coating.

<Heat-Insulation Rubber>

As shown in FIG. 3A, a heat-insulation rubber 14A is heated beforehand by a metal molding technique and formed into a ring shape by three-dimensional shaping is stretched up to a diameter larger than the rim flange portion 11$b$ by an attachment apparatus, and is attached on the outer circumference surface 11$d$ of the well portion 11$c$. At this time, the heat-insulation rubber 14A formed in a ring shape has, as shown in FIG. 2, a basal part 14$a$ which corresponds to the flat part of the well portion 11$c$ and which has a predetermined thickness, e.g., 2 mm in an attached condition. The heat-insulation rubber 14A also has end parts 14$b$, 14$b$ which are located in the vicinity of respective hump portions 11e, 11e and each of which has a cross section in the rim width direction formed into a shape of which thickness gradually decreases from the thickness of 2 mm toward the external side of the rim width direction (hereinafter, this shape is referred to as a "taper shape"). It is desirable that the leading end of the end part 14b should have a thickness of equal to or less than 0.5 mm.

As a result, it is possible to cover not only the flat part of the well portion 11c but also the rising parts of the well portion 11c in the vicinity of respective hump portions 11e, 11e by the heat-insulation rubber 14A.

Note that before the heat-insulation rubber 14A is attached on the outer circumference surface 11d of the well portion 11c inwardly of the outer circumference surface 11d of the rim 11, a bond, e.g., an epoxy-based bond is applied to such outer circumference surface 11d up to portions which reach respective hump portions 11e, 11e, and at which respective end parts 14b, 14b are correspondingly located.

When the rising parts of the well portion 11c located at both ends near the hump portions 11e, 11e in the rim width direction are inclined gently, the heat-insulation rubber can fit the rim outer circumference shape across the well portion 11c to the hump portion 11e as a heat-insulation rubber 14B itself can stretch, so that the heat-insulation rubber may be a heat-insulation rubber 14B formed in a simple ring shape as shown in FIG. 3B.

<Method of Mounting Heat-Insulation Rubber>

An explanation will be given of an attachment apparatus (not shown) which mounts the heat-insulation rubbers 14A, 14B formed in a ring shape beforehand on the outer circumference surface 11d of the rim 11 for the case of the heat-insulation rubber 14A as an example. The same is true of the case of the heat-insulation rubber 14B. A difference between the heat-insulation rubber 14A and the heat-insulation rubber 14B is just an inner circumferential shape of an inner circumference surface of the attachment apparatus to be discussed later. The attachment apparatus has 16 inner-circumference-surface pieces formed in an inner-circumference-surface shape acquired by dividing the outer circumference surface of the heat-insulation rubber 14A by a predetermined partial circumferential length, e.g., divided equally into 16 pieces. Each inner-circumference-surface piece is independently movable inwardly and outwardly of the radial direction, and air can be suctioned from the inner-circumference-surface side of the inner-circumference-surface pieces. The attachment apparatus first reduces a diameter of the inner-circumference-surface pieces until individual inner-circumference-surface pieces contact the outer circumference surface of the heat-insulation rubber 14A, and suctions air through individual inner-circumference-surface pieces to vacuum-suction the heat-insulation rubber 14A. Also, individual inner-circumference-surface pieces are evenly moved outwardly of the radial direction while continuing vacuum-suctioning so that the inner diameter of the heat-insulation rubber 14A becomes larger than the outer diameter of the rim flange portion 11b. In this condition, the attachment apparatus is caused to go over the rim flange portion 11b in an axial direction, and the individual inner-circumference-surface pieces are evenly shrunk inwardly of the radial direction with a position in the axial direction being maintained so as to be aligned relative to the well portion 11c to which the bond is applied. Finally, air is blown in from individual inner-circumference-surface pieces while the heat-insulation rubber 14A is being lightly pressed against the outer circumference surface 11d, and then the inner circumferential sides of respective inner-circumference-surface pieces and the outer circumference surface of the heat-insulation rubber 14A are separated from each other.

As each inner-circumference-surface piece has the inner circumference surface which corresponds to the outer circumference surface of the heat-insulation rubber 14A shown in FIG. 3A and which has a partial circumferential length, the end part 14b can be surely pressed against the rising part reaching the hump portion 11e of the rim 11, and can be tightly bonded thereto.

<Detailed Explanation for Heat-Insulation Rubber>

Next, with reference to FIGS. 4A to 6, the heat-insulation rubbers 14A, 14B will be explained in more detail.

An example of the rubber material for the heat-insulation rubber 14A, 14B is a butyl rubber (Isobutylene Isoprene Rubber: IIR). This material is often used as an inner liner 22 on the inner surface of the tire 20, and has a characteristic that the gas permeability is extremely little. Also, another example of the rubber material for the heat-insulation rubber 14A, 14B is a mixture of a butyl rubber with an ethylene propylene rubber (EPDM) that has good weather resistance.

Note that both butyl rubber and ethylene propylene rubber have low heat conductivity, are each a rubber material as it is which has good heat insulation property, and can be directly used as the heat-insulation rubber 14A, 14B.

Figure 4A:
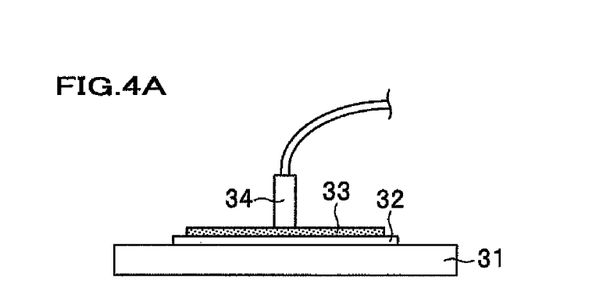
FIG. 4A is a diagram explaining a test method when the heat insulating property of a test piece of the heat-insulation rubber was examined, where it has a top view with the test piece being mounted.
Figure 4B:
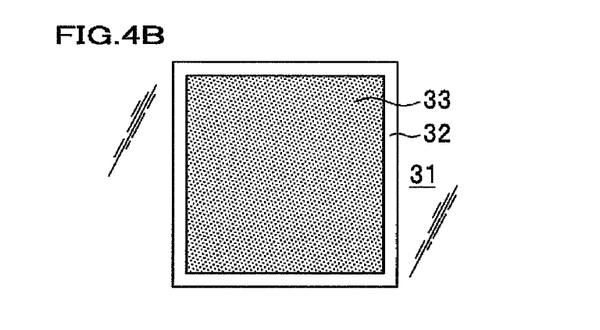
FIG. 4B is a diagram explaining the test method when the heat insulating property of the test piece of the heat-insulation rubber was examined, where it has a top view with the test piece being mounted.

FIGS. 4A and 4B are diagrams for explaining a test method for examining the heat insulation property of a piece of the heat-insulation rubber, where FIG. 4A is a side view and FIG. 4B is a top view with the test piece being mounted.

Figure 6:
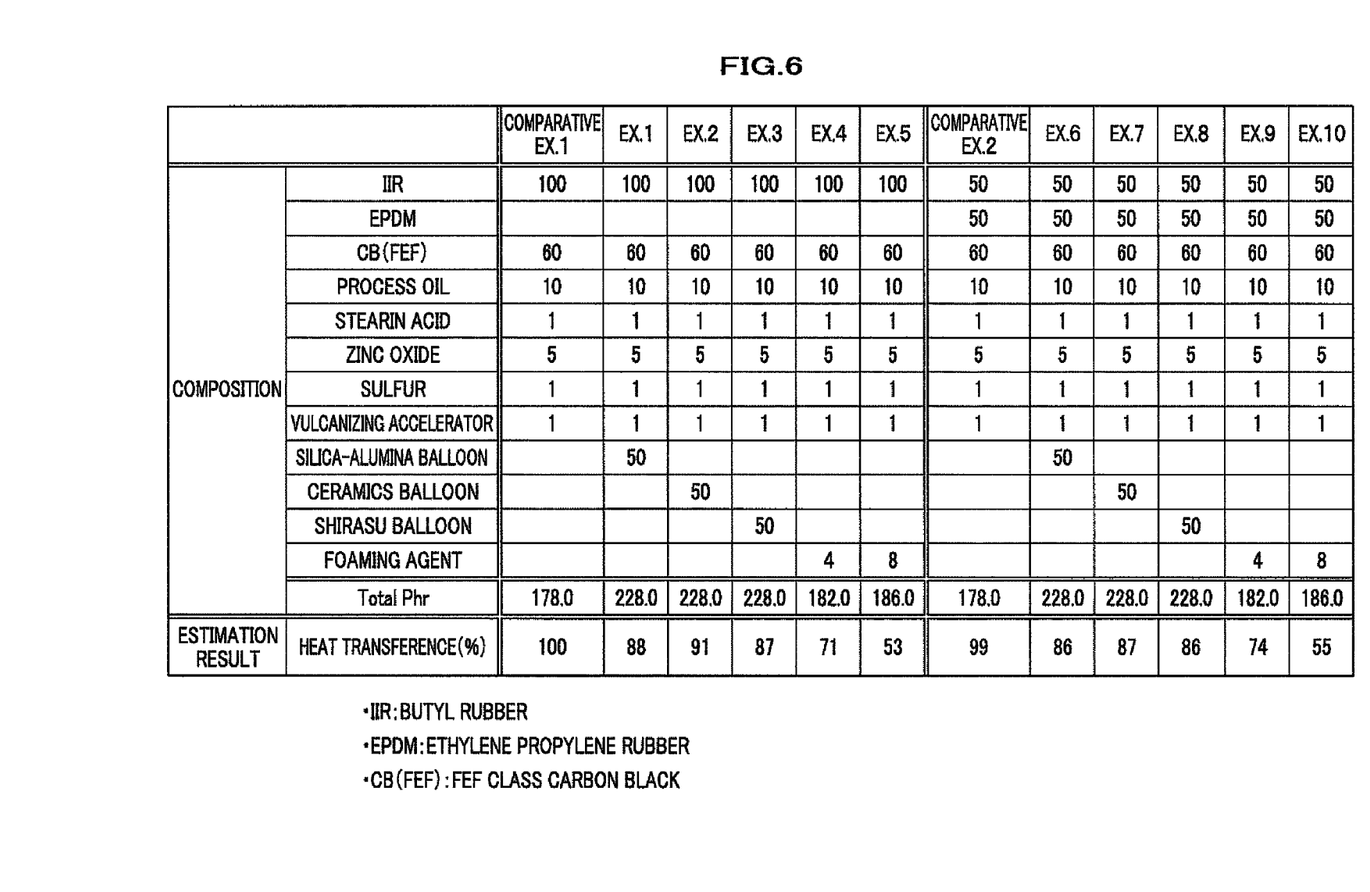
FIG. 6 is an explanatory diagram for a test result of a test piece of the heat-insulation rubber.

Starting with a butyl rubber as a basic rubber material, as shown in FIG. 6, the inventors of the present invention additionally mixed such a material with FEF (fast extrusion furnace) class carbon black, a process oil, stearin acid, zinc oxide, sulfur, and a vulcanizing accelerator, and in order to improve the heat-insulation performance, further mixed and kneaded hollow particles, such as silica-alumina balloons (hollow particles formed of inorganic materials), ceramics balloons (hollow particles formed of ceramics), and shirasu balloons (hollow particles formed of "shirasu" that is volcanic ash), or a foaming agent to produce pieces of the heat-insulation rubber.

Note that a term FEF class is a quality level depending on a production technique, and a term FEF means a fast extrusion furnace.

In the case of the foaming agent, the whole heat-insulation rubber is heated after mixed and kneaded, and then a gas is produced from the foaming agent to form gas bubbles in the heat-insulation rubber, thereby improving the heat-insulation performance. As such a foaming agent, a foaming agent of a type that substantially exhausts all gases producible from the foaming agent when maintained at a predetermined temperature for a certain time period is desirable from the standpoint of the productivity of the heat-insulation rubber.

Incidentally, it is preferable that a process of causing the foaming agent to produce a gas to produce gas bubbles in the heat-insulation rubber is carried out simultaneously with a process of heating the heat-insulation rubber through the foregoing metal molding to three-dimensionally shape the heat-insulation rubber 14A.

As shown in FIGS. 4A and 4B, the inventors of the present invention mounted an SPCC (Steel Plate Cold Commercial) steel sheet (cold-rolled steel sheet) 32 of 200 mm by 200 mm square with a thickness of 2 mm replicating the rim 11 on an isothermal temperature adjusting hot plate 31 that had a surface temperature set to 80° C. in a closely attached manner. Also, the inventors of the present invention mounted a test piece 33 of the heat-insulation rubber in a predetermined rectangular shape with a thickness of 2 mm on the SPCC steel sheet 32 in a closely attached manner and measured a temperature change of an upper surface of the test piece 33 of the heat-insulation rubber for ten minutes by a contact-type temperature sensor, and examined the heat-insulation property of the test piece 33 of the heat-insulation rubber from a saturation temperature.

Figure 5:
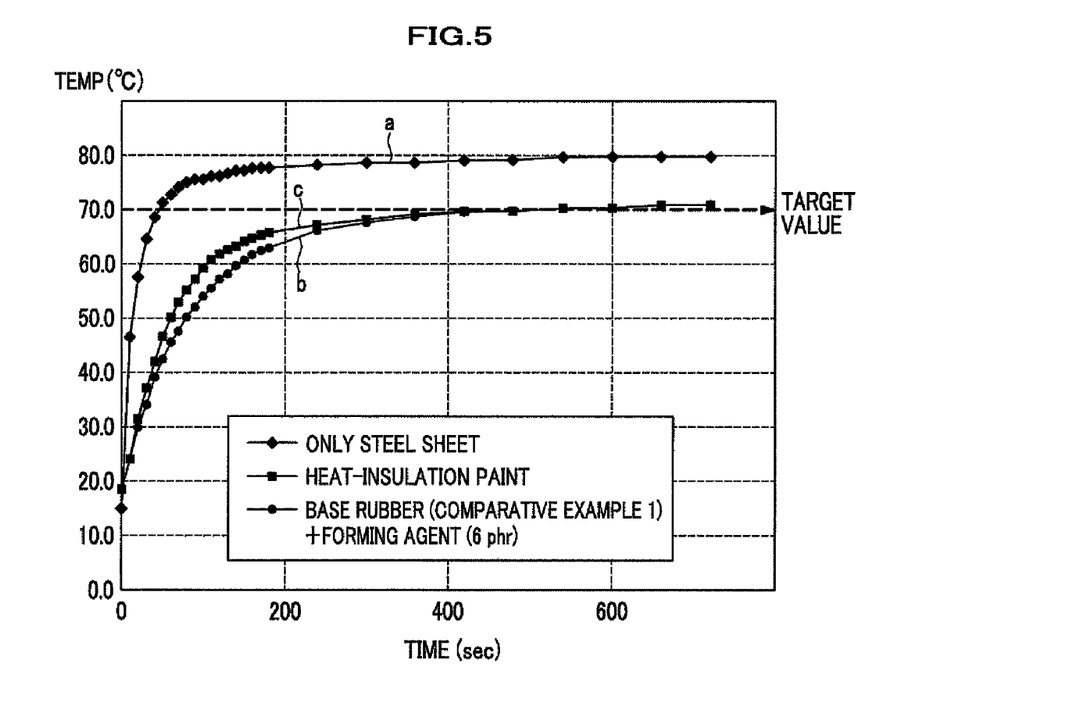
FIG. 5 is an explanatory diagram for a temperature measurement when measurement was made through the test method shown in FIGS. 4A and 4B.

FIG. 5 is an explanatory diagram for a temperature measurement when measurement was made through the test method shown in FIGS. 4A and 4B. As is indicated by a curve a, in a case where only the SPCC steel sheet 32 is used, a temperature reached substantially 80° C. after ten minutes. A comparison target for developing the material mixing for the heat-insulation rubber was the heat-insulation performance of a heat-insulation paint "GAINA" (registered trademark) with a thickness of 2 mm indicated by a curve c. Note that the heat-insulation paint "GAINA" has a heat-insulation performance of approximately 0.03 W/mK.

A curve b indicates a case in which 6 Phr of a foaming agent was mixed to a base material that was a first comparative example shown in FIG. 6.

Note that a term Phr (mentioned as PHR in some cases) means Per Hundred Rubber, i.e., a notation indicating parts by weight (pts. wt) that is a value of a weight of an additive agent relative to 100 weight of a rubber material. This notation makes it easier to understand pts. wt of an additive agent than an expression of an amount of an additive agent in a weight ratio relative to the whole additive agent even though the number of kinds of additive agent increases. Note that a term Total Phr in FIG. 6 is an addition expression of 100 weight of rubber with pts. wt of all other additive agents.

FIG. 6 is an explanatory diagram showing a test result of a test piece of the heat-insulation rubber. As a first comparative example, a heat-insulation rubber which had a butyl rubber of 100 weight as a rubber material mixed with an FEF class black carbon of 60 pts. wt, a process oil of 10 pts. wt, stearic acid of 1 pts. wt, a zinc oxide of 5 pts. wt, sulfur of 1 pts. wt, and a vulcanizing accelerator of 1 pts. wt, and which had a Total Phr of 178.0 was taken as a first base rubber. A heat transmission coefficient (W/m²K) when the first comparative example was examined as the test piece in FIGS. 4A and 4B was taken as 100% as a base. Respective heat transmission coefficients (W/m²K) when first to tenth examples and a second comparative example were tested as a test piece in FIGS. 4A and 4B were shown in a percent expression in "heat transference (%)" in "test result field" in FIG. 6. The lower the value of the heat transference is, the higher the heat-insulation performance is.

A first example was the first base rubber of the first comparative example added with silica-alumina balloons of 50 pts. wt, had Total Phr of 228.0, and had heat transference of 88%. A second example was the first base rubber of the first comparative example added with ceramics balloons of 50 pts. wt, had Total Phr of 228.0, and had heat transference of 91%. A third example was the first base rubber of the first comparative example added with shirasu balloons of 50 pts. wt, had Total Phr of 228.0, and had heat transference of 87%. A fourth example was the first base rubber of the first comparative example added with a foaming agent of 4 pts. wt, had Total Phr of 182.0, and had heat transference of 71%. A fifth example was the first base rubber of the first comparative example added with a foaming agent of 8 pts. wt, had Total Phr of 186.0, and had heat transference of 53%.

The second comparative example was a heat-insulation rubber as second base rubber which had, as rubber materials, 50 weight of a butyl rubber and 50 weight of an ethylene propylene rubber having good antiweatherbility that were mixed with the FEF class black carbon of 60 pts. wt, a process oil of 10 pts. wt, a stearic acid of 1 pts. wt, a zinc oxide of 5 pts. wt, sulfur of 1 pts. wt, and a vulcanizing accelerator of 1 pts. wt, had Total Phr of 178.0, and had heat transference of 99%.

A sixth example was the second base rubber of the second comparative example added with silica-alumina balloons of 50 pts. wt, had Total Phr of 228.0, and had heat transference of 86%. A seventh example was the second base rubber of the second comparative example added with ceramics balloons of 50 pts. wt, had Total Phr of 228.0, and had heat transference of 87%. An eighth example was the second base rubber of the second comparative example added with shirasu balloons of 50 pts. wt, had Total Phr of 228.0, and had heat transference of 86%. A ninth example was the second base rubber of the second comparative example added with a foaming agent of 4 pts. wt, had Total Phr of 182.0, and had heat transference of 74%. A tenth example was the second base rubber of the second comparative example added with a foaming agent of 8 pts. wt, had Total Phr of 186.0, and had heat transference of 55%.

Note that specific names (registered trademarks) and manufacturers of composition elements used for evaluation in FIG. 6 are as follows. A butyl rubber (IIR) was a butyl rubber "BROMOBUTYL3344" (registered trademark) of Japan Butyl Co., Ltd., an ethylene propylene rubber was an ethylene propylene rubber "ESPRENE301A" (registered trademark) of Sumitomo Chemical Co., Ltd, a vulcanizing accelerator was "NOCCELER-NS-P" of Ouchi Shinko Chemical Industrial Co., Ltd., which was N-ter-butyl-2-benzothiazolyl-sulfenicamide, silica-alumina balloon was "Cenolite" (registered trademark) of Tomoe Engineering Co., Ltd., a ceramics balloon was "E-SPHERES" (registered trademark) of Taiheiyo Cement Corporation, a shirasu balloon was "Winlite9011" (registered trademark) of Izichi Chemical Industry Co., Ltd., and a foaming agent was "ExellarQ" (registered trademark) of Eiwa Chemical Ind. Co., Ltd., which contains N,N'-dinitrosopentamethylenetetramine (DNPT) and azodicarboxylicamide (ADCA) as main constituents.

The reason why the percentage of the foaming agent in the fourth, fifth, ninth, and tenth examples was set to 4% or 8% was to study the heat-insulation effect of the heat-insulation rubber and a shape of a gas foam in a cut cross section of the heat-insulation rubber by changing the amount of foaming agent. It was found if the amount of the foaming agent is excessive, a wall between adjoining isolated produced gas bubbles becomes too thin and substantially successive gas bubbles are formed, or a large foam (successive gas bubbles) is formed, so that the heat-insulation effect is deteriorated by the convection flow of a gas in the foam. As a result, it was found, in order to form gas bubbles having a wall between adjoining non-successive gas bubbles with a thickness equal to or thicker than a predetermined thickness, pts. wt of 4 to 8 of the foaming agent is appropriate.

Gas bubbles having a wall between adjoining non-successive gas bubbles with a thickness of equal to thicker than the predetermined thickness is referred to as "isolated gas bubbles". A composition in which pts. wt of 4 to 8 of the foaming agent relative to 100 weight of the rubber material corresponds to "a composition for generating isolated gas bubbles".

As is clear from the result in FIG. 6, a heat-insulation rubber which is light-weighted and has a better heat-insulation property can be obtained if the foaming agent is used rather than using the hollow particles, such as the silica-alumina balloons, the ceramics balloons, or the shirasu balloons. Also, when the bead portion 21a (see FIG. 1) is fallen on the heat-insulation rubber 14A (see FIG. 1) at the time of fitting or removal of the tire 20, the gas bubbles formed in the heat-insulation rubber by the foaming agent do not break down. Also, as the foams are each fully filled with the gas, when the bead portion 21a is removed, even squashed gas bubbles can recover to a normal condition by the elastic force of the heat-insulation rubber, so that the heat-insulation performance is not likely to change. In contrast, in the case of the hollow particles, such as the silica-alumina balloons, the ceramics balloons, or the shirasu balloons, when the bead portion 21a is fallen on the heat-insulation rubber at the time of fitting or removal of the tire 20, the hollow particles are damaged, and the heat-insulation property may change. Therefore, it is desirable that such hollow particles should have a small diameter, and should be caused to have a sufficient strength.

Next, with reference to FIGS. 7A to 8, and FIG. 1 as needed, an explanation will be given of an effect of rising an air temperature in the tire air chamber MC by attaching the heat-insulation rubber 14A on the outer circumference surface 11d of the well portion 11c of the rim 11 to suppress any diffusion of generated heat of the tire.

Figure 7A:
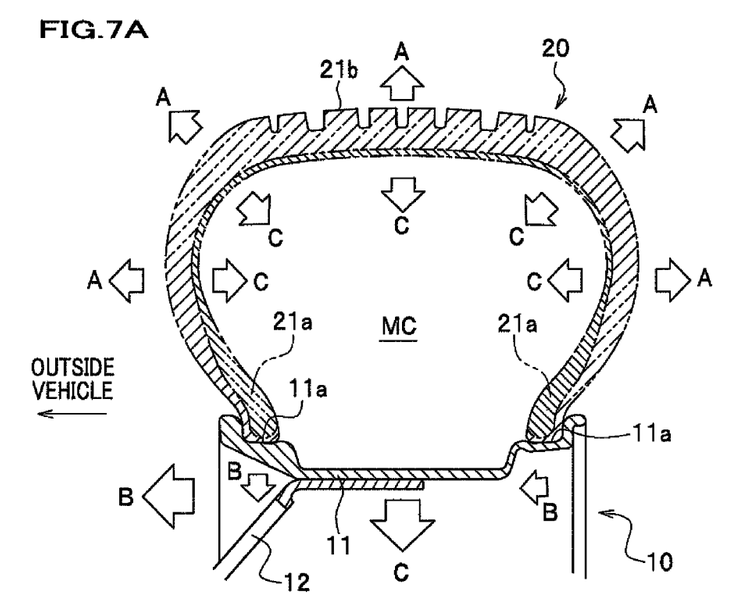
FIG. 7A shows a heat transfer path from a tire air chamber in running, and is an explanatory diagram for a case of a vehicle wheel having no heat-insulation rubber as a comparative example.
Figure 7B:
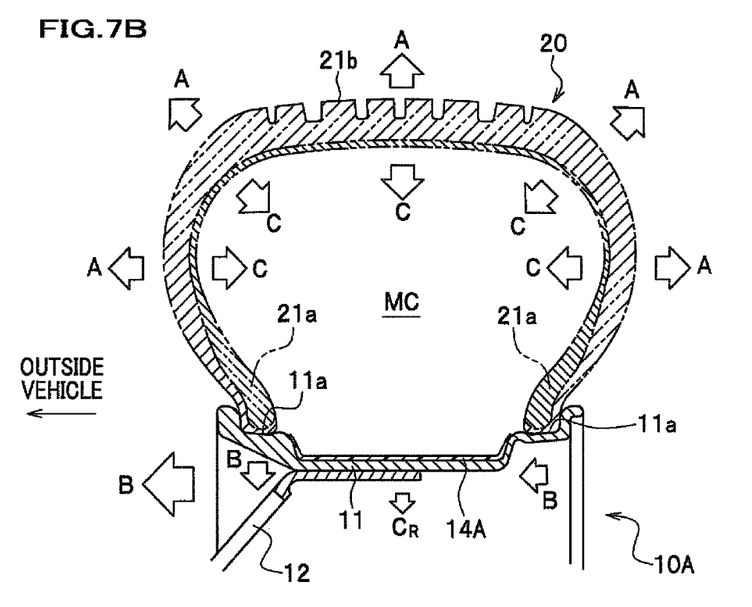
FIG. 7B shows a heat transfer path from a tire air chamber in running, and is an explanatory diagram for a case of a vehicle wheel having the heat-insulation rubber according to the first embodiment.
Figure 8:
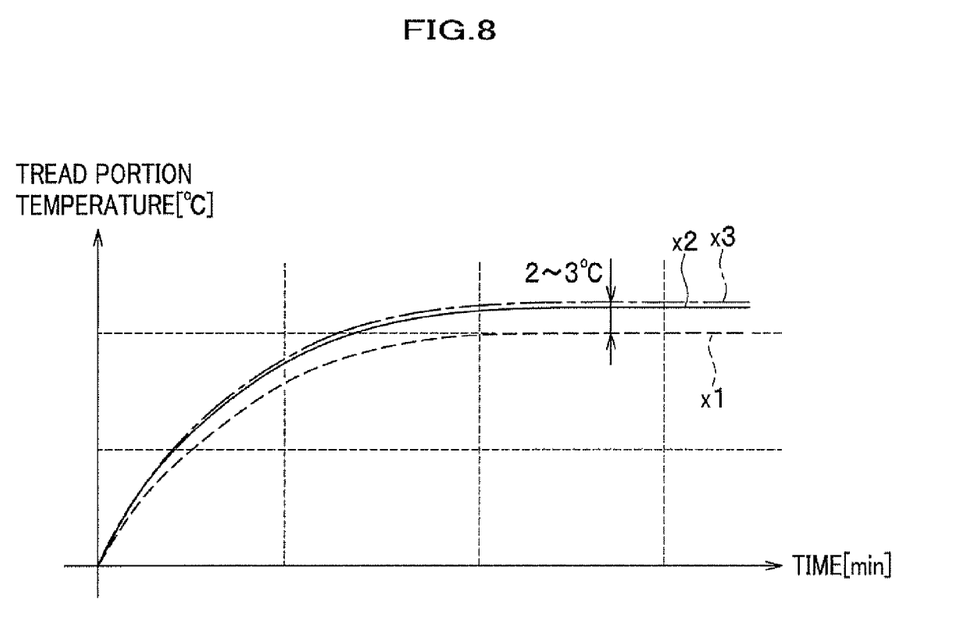
FIG. 8 is an explanatory diagram for a temporal transition of a temperature at a tread portion of a tire after a vehicle starts running.

FIGS. 7A and 7B show heat transfer paths from the tire air chamber in running, where FIG. 7A is an explanatory diagram in a case of a vehicle wheel having no heat-insulation rubber as a comparative example, and FIG. 7B is an explanatory diagram in a case of a vehicle wheel having the heat-insulation rubber according to the first embodiment. FIG. 8 is an explanatory diagram for a temporal transition of a temperature at the tread portion of a tire after a vehicle starts running.

Note that in FIGS. 7A and 7B, also, an under-coat layer which is a clear paint is omitted.

As the vehicle starts running, the tread portion 21b starts generating heat by a friction with a road surface, and the shoulder portions of the tire 20, the side portions thereof, etc., generate heat due to hysteresis loss by a rolling friction or are heated by heat conduction.

In the case of a vehicle wheel 10 having no heat-insulation rubber as a comparative example, heat generated by self-heating of the tire 20 are dissipated through the following three paths:

(1) a path dissipating heat directly from the surface of the tire 20 to the atmosphere as is indicated by an arrow A;

(2) a path dissipating a heat from the bead portion 21a to the atmosphere through the rim 11 and a disc 12 via the bead seating portion 11a as is indicated by an arrow B; and (3) a path heating the air in the tire air chamber MC and dissipating heat through the disc 12 via the rim 11 as is indicated by an arrow C.

In contrast, in the case of the vehicle wheel 10A of the first embodiment, the heat-dissipation paths (1) and (2) are common in the case of the vehicle wheel 10, but regarding the path (3), the heat-insulation rubber 14A suppresses any heat transfer from the tire air chamber MC to the rim 11 as is indicated by an arrow $C_R$, and the high heat-insulation performance is accomplished, so that the temperature at the tire air chamber MC increases in comparison with the case of the vehicle wheel 10 which is the comparative example.

This can be simulated through a calculation. In the graph in FIG. 8, an axis of ordinate indicates a temperature of the tread portion 21b of the tire 20 and an axis of abscissa indicates an elapsed time after the vehicle starts running. A curve x1 indicates a comparative example having no heat-insulation rubber 14A, a curve x2 indicates another comparative example having a layer of the heat-insulation paint (thickness: 2 mm) and a curve x3 indicates a case with the heat-insulation rubber 14A of the first embodiment (thickness: 2 mm). The condition of the heat-insulation rubber 14A was the composition represented by the fifth example in the table of FIG. 6, and a heat-insulation performance of 0.03 W/m·K was accomplished.

In this case, it is clear that the temperature of the tread portion of the tire can be set to be 2 to 3° C. higher than the curve x1 of the comparative example. As a result, the rolling resistance can be reduced by what corresponds to such higher temperature setting, and the fuel economy improves by approximately 1% in the LA-4 mode (an urban zone running mode) which is used for an automotive fuel economy test in U.S.A.

Note that the heat-insulation paint of the curve x2 of the comparative example was the foregoing heat-insulation paint "GAINA". It becomes clear that this heat-insulation paint and the heat-insulation rubber 14A of the first embodiment can obtain substantially the same heat-insulation property.

In a case of the composition of the tenth example shown in FIG. 6, the heat transference (%) in the foregoing evaluation result was 55% with respect to 53% which was the heat transference of the fifth example, so that there is substantially no difference therebetween, and the weather resistance was improved.

Note that because heat around a bead wire (not shown) of the tire 20 is dissipated to the atmosphere through the rim 11 and the disc 12 via the bead seating portion 11a, it can be avoided that the temperature at the bead portion 21a becomes too high.

Figure 9:
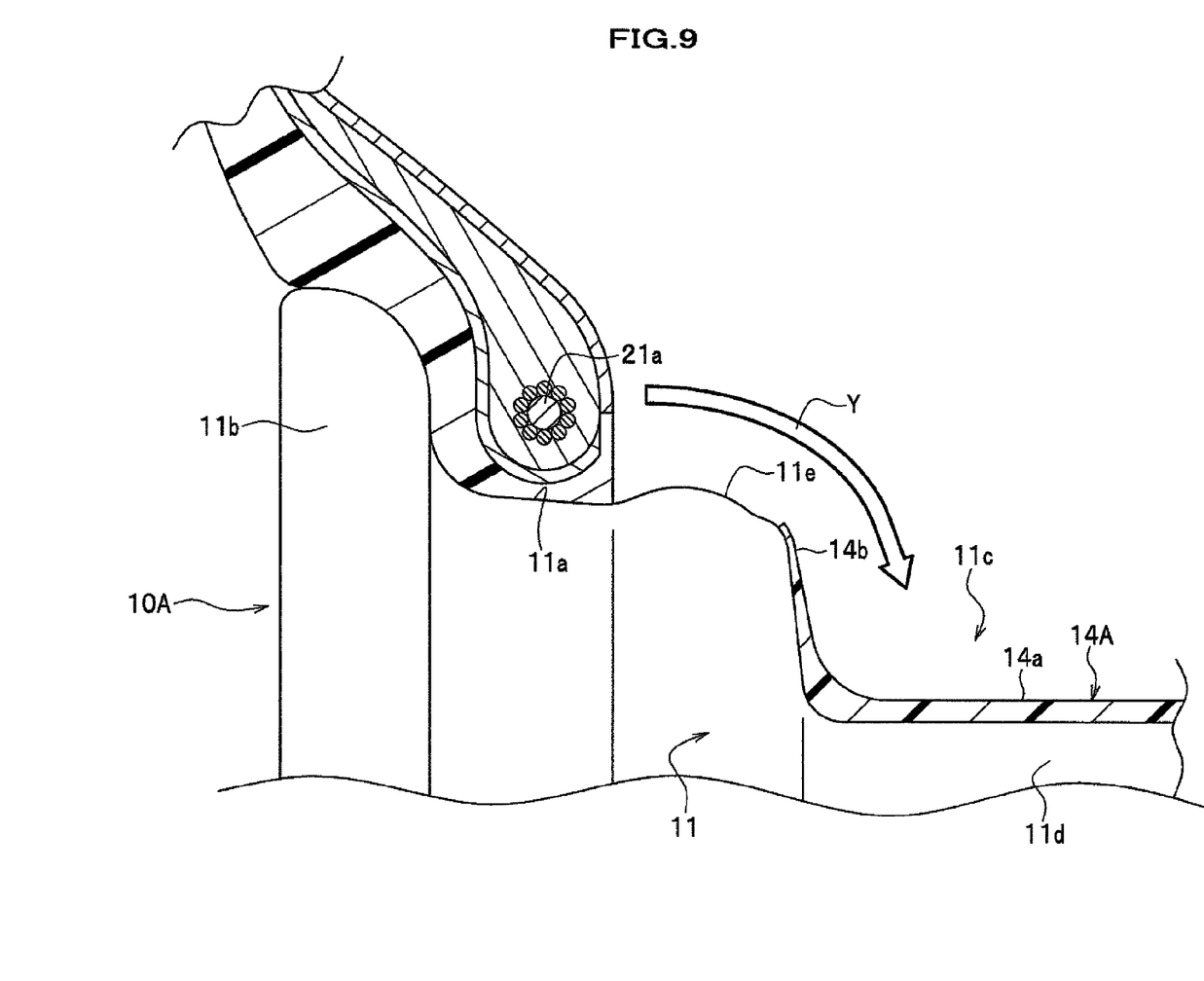
FIG. 9 is a diagram showing how an end of the heat-insulation rubber is hardly caught when a bead portion of a tire is fallen into a well of a rim.

Next, an explanation will be given of an effect of the cross-sectional shape of the end part 14b of the heat-insulation rubber 14A at the time of attachment of the tire 20 to the vehicle wheel 10 or removal thereof from the vehicle wheel 10 with reference to FIG. 9. FIG. 9 is a diagram for explaining how the end part of the heat-insulation rubber is hardly caught when the bead portion of the tire is fallen onto the well portion of the rim.

As shown in FIG. 9, the heat-insulation rubber 14A formed into a ring shape has a base 14a which corresponds to the flat part of the well portion 11c and which has a thickness of 2 mm when attached. Each of the end parts 14b, 14b near the hump portions 11e, 11e, respectively, located outwardly of the rim width direction has a cross section in the rim width direction in which a thickness thereof decreases from 2 mm toward the external side of the rim width direction in an attached condition.

As a result, as is indicated by an arrow Y, when the bead portion 21a is slid inwardly of the rim width direction from the bead seating portion 11a and fallen onto the outer circumference surface 11d of the well portion 11c, the possibility that the bead portion 21a catches the end part 14b and peels or damages the heat-insulation rubber 14A becomes little, and a condition in which the heat-insulation rubber 14A is closely attached to the outer circumference surface 11d is maintained.

As explained above, according to this embodiment, in comparison with a case in which a heat-insulation paint that forms a heat-shield/heat-insulation layer is applied like the foregoing prior art disclosed in JP2009-73247A, the heat-insulation layer can be formed on the outer circumference surface 11d of the rim 11 with a uniform predetermined thickness, and a target heat-insulation performance can be surely accomplished. As shown in FIG. 8, when the temperature of tire rises due to a friction with a road surface as the vehicle runs, the heat is transferred to air in the tire air chamber MC, and the temperature of air in the tire air chamber MC rises, it is possible to suppress any dissipation of heat to the atmosphere through the rim 11 and the disc 12 via a portion where the air in the tire air chamber MC contacts the outer circumference surface 11d of the rim 11 of the vehicle wheel by the heat-insulation rubber of the first embodiment having the same thickness as that of the heat-insulation paint and having a substantially the same heat-insulation performance.

Moreover, it is difficult to thickly paint the heat-insulation paint once, and recoating thereof has a poor workability. In contrast, in the case of the heat-insulation rubber 14A of the first embodiment, the heat-insulation rubber 14A formed into a ring shape through a metal molding technique while being heated beforehand can be mechanically attached, at a rim-width-direction position on the outer circumference surface 11d of the well portion 11c on which a bond is applied as explained in the foregoing attachment method of the heat-insulation rubber. Accordingly, the workability is good, and the thickness of the heat-insulation rubber 14A after attachment can be easily set to a predetermined thickness relative to not only the rim width direction of the vehicle wheel 10 but also the circumferential direction. Also, the contractive force of the heat-insulation rubber 14A can be utilized as the fixing force to the outer circumference surface 11d.

In addition, the heat-insulation rubber 14A formed in the ring shape has the end parts 14b, 14b which are located near the hump portions 11e, 11e, respectively, located outwardly in the rim width direction and which have respective cross sections each gradually reducing its thickness from a thickness of 2 mm toward the external side of the rim width direction in an attached condition. Accordingly, the possibility that the bead portion 21a catches the end part 14b of the heat-insulation rubber 14A and peels or damages the heat-insulation rubber 14A can be reduced when the bead portion 21a of the tire 20 is fallen onto the well portion 11c of the rim 11.

In comparison with a case in which the hollow particles are mixed in the heat-insulation rubber like the first to third and sixth to eighth examples shown in FIG. 6, the heat-insulation performance of the heat-insulation rubber can be further improved and such a heat-insulation rubber can be light-weighted when the foaming agent is used like the fourth, fifth, ninth and tenth examples.

In this embodiment, the end part 14b of the heat-insulation rubber 14A is formed so as to have a tapered cross section in the rim width direction at the time of metal molding. However, such a cross section in the rim width direction may be formed in a tapered shape after metal molding.

<<Second Embodiment>>

Next, with reference to FIG. 10, an explanation will be given of a vehicle wheel 10B according to a second embodiment of the present invention.

The same structural elements as those of the first embodiment will be denoted by the same reference numerals, and a duplicated explanation will be omitted below. The difference of the vehicle wheel 10B of the second embodiment from the vehicle wheel 10A of the first embodiment is in the outer circumferential shape of the well portion 11c. The vehicle wheel 10B has substantially no hump portions 11e, 11e shown in FIG. 1, and the outer circumference surface 11d of the well portion 11c has a cross section in the rim width direction changing in that direction. Correspondingly to this shape change, a ring-shaped heat-insulation rubber 14C has an inner circumference side and an outer circumference side both changing in the rim width direction, and is formed by three-dimensional metal molding so as to maintain a predetermined thickness, e.g., 2 mm.

At the time of three-dimensional metal molding, like the end part 14b of the first embodiment, end parts $14b_A$, $14b_B$ are also formed. In the second embodiment, the thickness of a base $14a_A$ adjoining to the end part $14b_A$ at the outer side of a vehicle width in the rim width direction, the thickness of a center base 14a in the rim width direction, and the thickness of a base $14a_B$ adjoining to the end part $14b_B$ at the internal side of the vehicle width in the rim width direction differ from one another. The base 14a has the greatest thickness, and the base $14a_A$ has a greater thickness than that of the base $14a_B$. This configuration is provided because the shape from the bead seating portion 11a to the well portion 11c in the vehicle wheel 10B differs between the outer side of the vehicle width and the inner side of the vehicle width. In addition, this configuration is provided to prevent the end part $14b_B$ and the base $14a_B$ from being caught and turned, from being damaged and from being broken when the bead portion 21a of the internal side of the vehicle width is fallen onto the well portion 11c.

Figure 10:
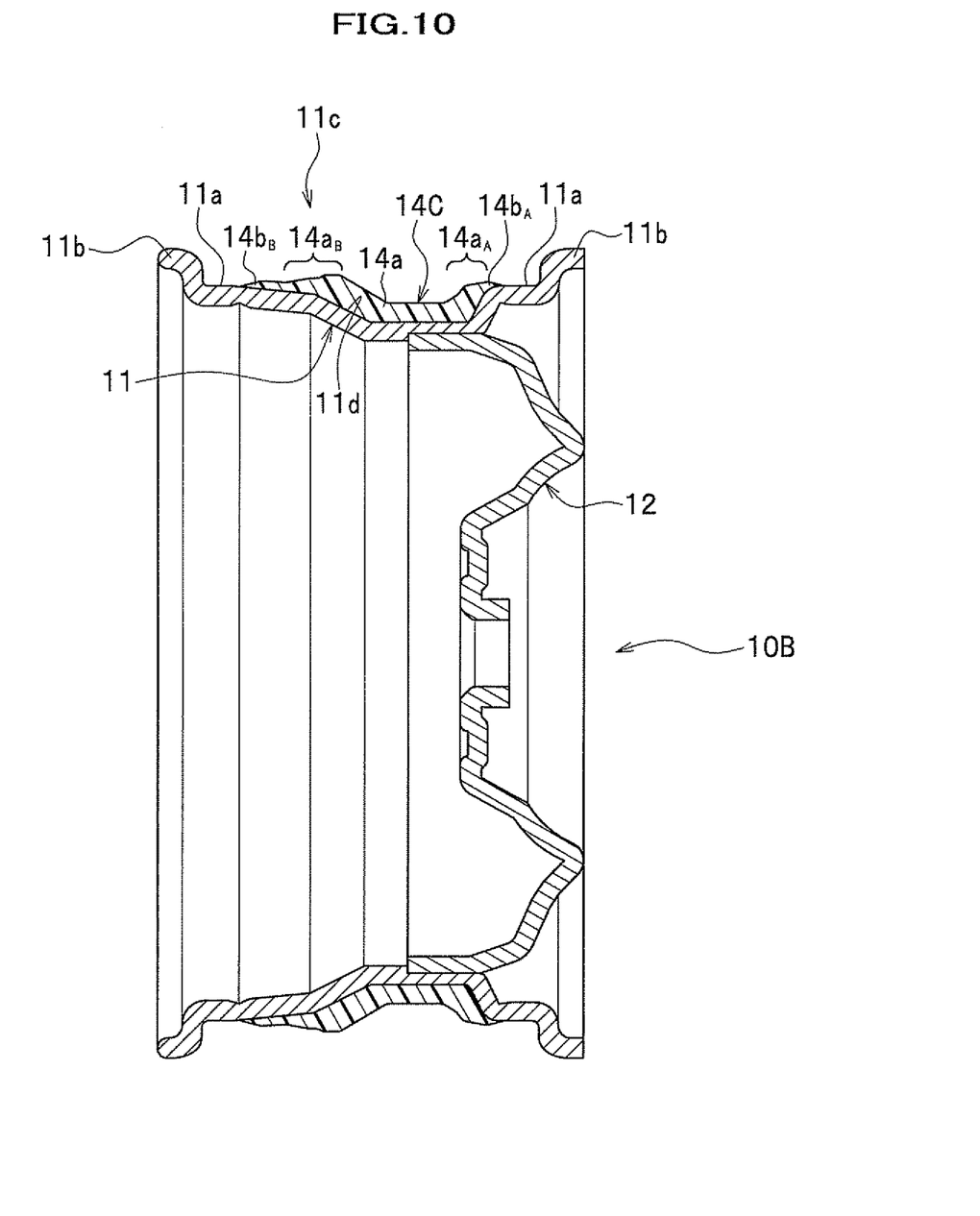
FIG. 10 is an explanatory diagram for a cross-section shape of a heat-insulation rubber which is formed so as to match the contour of a rim outer circumference surface in a rim width direction and which is attached to a vehicle wheel according to a second embodiment.

As shown in FIG. 10, because the inner-circumference-surface side of the heat-insulation rubber 14C is shaped so as to match the cross-sectional contour of the outer circumference surface 11d of the rim 11 in the rim width direction, the heat-insulation rubber 14C can be caused to closely attached to the outer circumference surface 11d of the vehicle wheel having the outer circumference surface 11d of the rim 11 of the well portion 11c normally not flat. As a result, it is possible to suppress any heat transfer to the rim 11 from a portion of the outer circumference surface 11d where air in the tire air chamber MC contacts.

What is claimed is:

1. A vehicle wheel comprising a heat-insulation rubber that covers a portion of a rim outer circumference surface where air in a tire air chamber contacts, wherein
   the heat insulating rubber is disposed centrally along the rim outer circumference surface and spaced apart in a rim width direction from a bead seating portion of the rim outer circumference surface disposed on each side thereof,
   the heat insulating rubber is U-shaped in cross-section with a base portion and a substantially perpendicular side portion disposed on each end of the base portion,
   the heat insulating rubber disposed against the outer surface of a well portion of the rim,
   the side portions of the heat insulating rubber have a part whose thickness gradually decreases as a location at the part goes toward an end part of each side portion of the heat-insulation rubber,
   the end part of each side portion of the heat-insulation rubber extends up to abut a base of a hump portion on the rim outer circumference surface, and
   the hump portion is disposed between the bead seating portion and the end part of the heat-insulation rubber.

2. The vehicle wheel according to claim 1, wherein the heat-insulation rubber is shaped into a ring and is fitted onto the portion of the rim outer circumference surface where the air in the tire air chamber contacts.

3. The vehicle wheel according to claim 1, wherein the heat-insulation rubber is shaped so as to match a cross-sectional contour of the rim outer circumference surface in a the rim width direction.

4. The vehicle wheel according to claim 2, wherein the heat-insulation rubber shaped into the ring is produced by a production method comprising:
   mixing a predetermined amount of a foaming agent in advance with a rubber material for the heat-insulation rubber to have a composition for generating isolated gas bubbles, before the rubber material is shaped into the ring;
   kneading the mixture; and heating when shaping the kneaded mixture into the ring to cause the foaming agent to foam to produce the heat-insulation rubber including the isolated gas bubbles therein.

5. The vehicle wheel according to claim 1, wherein:

the rim outer circumference surface includes a well portion disposed centrally in the rim width direction that is depressed in a wheel radial direction with respect to the bead seating portion, the bead seating portion is configured to engage with a bead portion of a vehicle tire, and the heat-insulation rubber is disposed along the well portion.

\* \* \* \* \*